United States Patent
Kaneko et al.

(10) Patent No.: US 7,545,363 B2
(45) Date of Patent: Jun. 9, 2009

(54) USER INTERFACE CONTROLLING APPARATUS, USER INTERFACE CONTROLLING METHOD, AND COMPUTER PROGRAM

(75) Inventors: Jun Kaneko, Kanagawa (JP); Tomoyuki Yamamoto, Kanagawa (JP); Kazuhito Sumiyoshi, Tokyo (JP); Setsushi Minami, Tokyo (JP); Shunsuke Aoki, Kanagawa (JP)

(73) Assignee: Sony Corporation, Tokyo (JP)

( * ) Notice: Subject to any disclaimer, the term of this patent is extended or adjusted under 35 U.S.C. 154(b) by 715 days.

(21) Appl. No.: 11/116,289

(22) Filed: Apr. 28, 2005

(65) Prior Publication Data

US 2005/0278738 A1    Dec. 15, 2005

(30) Foreign Application Priority Data

May 13, 2004   (JP)   ............................ 2004-143170

(51) Int. Cl.
G09G 5/00   (2006.01)
(52) U.S. Cl. .......................... 345/158; 348/734; 725/39
(58) Field of Classification Search ................. 345/156, 345/158, 169; 348/734; 725/56, 39, 41
See application file for complete search history.

(56) References Cited

U.S. PATENT DOCUMENTS

| 5,889,506 | A  | * | 3/1999 | Lopresti et al. ............. 345/158 |
| 6,351,595 | B1 |   | 2/2002 | Kim |
| 6,747,591 | B1 | * | 6/2004 | Lilleness et al. ............ 341/176 |
| 7,373,652 | B1 | * | 5/2008 | Bayrakeri et al. ............. 725/53 |
| 2002/0057297 | A1 |   | 5/2002 | Grimes et al. |
| 2002/0082845 | A1 |   | 6/2002 | Sato |
| 2002/0107973 | A1 |   | 8/2002 | Lennon et al. |
| 2002/0140805 | A1 | * | 10/2002 | Gutta et al. ................... 348/40 |
| 2003/0126601 | A1 |   | 7/2003 | Roberts et al. |
| 2004/0051695 | A1 | * | 3/2004 | Yamamoto et al. .......... 345/156 |
| 2004/0078188 | A1 |   | 4/2004 | Gibbon et al. |
| 2006/0121939 | A1 | * | 6/2006 | Anwar et al. .............. 455/556.2 |
| 2006/0130098 | A1 | * | 6/2006 | Rao et al. ...................... 725/53 |

FOREIGN PATENT DOCUMENTS

| EP | 0 448 011 A1 | 9/1991 |
| EP | 0748 129 A2 | 12/1996 |
| EP | 1 085 767 A2 | 3/2001 |
| EP | 1 158 794 A1 | 11/2001 |
| GB | 2 087 623 A | 5/1982 |
| JP | 60-22790 | 2/1985 |
| JP | 62-84479 | 4/1987 |
| JP | 63-133350 | 6/1988 |

(Continued)

*Primary Examiner*—Amr Awad
*Assistant Examiner*—Stephen G Sherman
(74) *Attorney, Agent, or Firm*—Oblon, Spivak, McClelland, Maier & Neustadt, P.C.

(57) ABSTRACT

A user interface controlling apparatus is disclosed which includes an inputting section for inputting user operation information, and a display controlling section for controlling display of data in a switched manner on a display unit based on input information from the inputting section. The display controlling section exercises control, based on the input information coming from the inputting section designating any of upward-, downward-, rightward-, and leftward-pointing buttons, over selection of a data aggregate to be displayed from data aggregates including different categories of data, and over selection of category data for display from the selected data aggregate, before outputting the selected category data to the display unit.

10 Claims, 13 Drawing Sheets

FOREIGN PATENT DOCUMENTS

| | | |
|---|---|---|
| JP | 2-193349 | 7/1990 |
| JP | 2-239469 | 9/1990 |
| JP | 2-252155 | 10/1990 |
| JP | 3-134849 | 6/1991 |
| JP | 3-228243 | 10/1991 |
| JP | 2002-044218 | 2/2002 |
| JP | 2002-541740 A | 12/2002 |
| JP | 2004-356774 | 12/2004 |
| WO | WO 00/60854 | 10/2000 |
| WO | WO 03/043318 A1 | 5/2003 |
| WO | WO 2005/109157 A1 | 11/2005 |
| WO | WO 2005/121932 A1 | 12/2005 |

\* cited by examiner

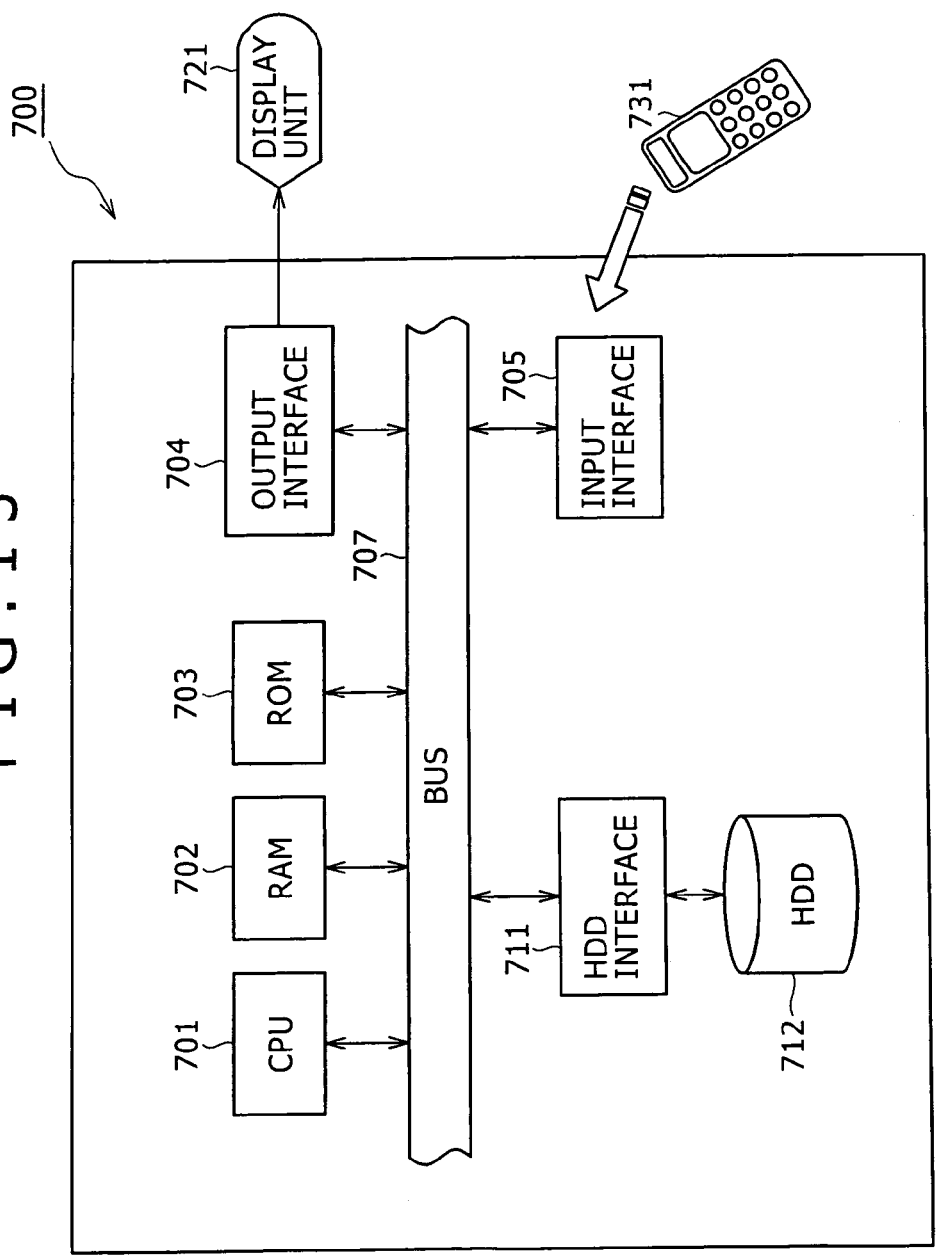

USER INTERFACE CONTROLLING APPARATUS, USER INTERFACE CONTROLLING METHOD, AND COMPUTER PROGRAM

CROSS REFERENCE TO RELATED APPLICATIONS

The present invention contains subject matter related to Japanese Patent Application JP 2004-143170 filed in the Japanese Patent Office on May 13, 2004, the entire contents of which being incorporated herein by reference.

BACKGROUND OF THE INVENTION

The present invention relates to a user interface controlling apparatus, a user interface controlling method, and a computer program. More particularly, the invention relates to a user interface controlling apparatus, a user interface controlling method, and a computer program for displaying different categories of data such as text and picture information on a display unit in a manner switchable as selected by a user.

Rapid progress in digital technology has made it possible to store large quantities of audio and video (AV) data without deterioration over time. Today, recording media such DVD (digital versatile disk) and HDD (hard disk drive) with capacities of tens of gigabytes or more are available at relatively low prices. Some recording devices are designed to record captured data directly onto HDD or DVD. The trend toward ever-larger capacities of recording media is enabling recording processing devices to record and store numerous TV programs.

With so many TV program getting recorded and stored on the recording media of mass storage, it has become progressively burdensome for the user to select desired TV programs and reserve the selected programs for unattended recording. In order to alleviate the burdens on the user, systems have been developed to automatically store user preference and profile information and record or reserve for unattended recording the TV programs selected on the basis of such information.

The process of automatic recording reservation is carried out illustratively using EPG (electronic program guide) distributed by broadcast stations. EPG is typically constituted by broadcast dates, broadcast channel numbers, information about persons appearing in TV programs, outlines of TV programs, and other attribute information corresponding to the contents to be broadcast. The recording processing device generally receives EPG, matches the received guide against the user preference and profile information retained in its storage unit so as to select automatically the contents to be reserved for unattended recording. The process of automatic recording reservation is discussed illustratively in Japanese Patent Laid-open No. 2002-24862.

Having received EPG (electronic program guide), the user's device may display content information included in the received guide such as information about personalities featured in TV programs and overviews of TV programs. The display allows the user to know a general outline of the contents to be broadcast.

However, selecting TV programs to be recorded solely on the basis of the preference information kept in the storage unit does not necessarily result in making program recording reservations to the user's taste. That means there always exists the need for presenting program-related information such as broadcast schedules on the display unit to let the user directly select desired TV programs. Thus it has been desired to bring efficiency to the process in which the user selects preferred TV programs from among large numbers of programs.

SUMMARY OF THE INVENTION

The present invention has been made in view of the above circumstances and provides a user interface controlling apparatus, a user interface controlling method, and a computer program for allowing different categories of data such as text and picture information to be switched as selected by a user when presented on a display unit so that relevant data may be selectively displayed in an efficient manner from among numerous items of data in multitudinous varieties.

The present invention also provides a user interface controlling apparatus, a user interface controlling method, and a computer program for selecting a specific category of data from among different categories of descriptive information including schedules of TV programs to be broadcast, text information, and picture information and for displaying the selected data on a display unit so that the user may acquire necessary information and select desired TV programs efficiently.

According to one embodiment of the present invention, there is provided a user interface controlling apparatus including: an inputting section for inputting user operation information; and a display controlling section for controlling display of data in a switched manner on a display unit based on input information from the inputting section; wherein the display controlling section exercises control, based on the input information coming from the inputting section designating any of upward-, downward-, rightward-, and leftward-pointing buttons, over selection of a data aggregate to be displayed from data aggregates including different categories of data, and over selection of category data for display from the selected data aggregate, before outputting the selected category data to the display unit.

In one preferred structure of the user interface controlling apparatus according to the invention, the data aggregates may be made up of description data formed by combinations of at least one of text data, picture data, and program information data as the different categories of data; and the display controlling section may exercise control, based on the input information coming from the inputting section designating any of the upward-, downward-, rightward-, and leftward-pointing buttons, over selection of particular description data, and over selection of any one of the text data, picture data, and program information data constituting the category data for display from the selected description data, before outputting the selected data to the display unit.

In another preferred structure of the user interface controlling apparatus according to the invention, the display controlling section may exercise control, based on the input information coming from the inputting section designating any of the upward-, downward-, rightward-, and leftward-pointing buttons, over a scrolling display of description titles as identifiers of the data aggregates and, during the scrolling display, over display of the description titles covering the data belonging to the category designated beforehand for display, in a manner different from the description titles not covering the data.

In a further preferred structure of the user interface controlling apparatus according to the invention, the display controlling section may give an animated display showing that the description titles not covering the data belonging to the category designated beforehand for display are skipped.

In an even further preferred structure of the user interface controlling apparatus according to the invention, the display controlling section may perform, based on the input information coming from the inputting section designating any of the upward-, downward-, rightward-, and leftward-pointing buttons, a scrolling display of description titles as identifiers of the data aggregates, as well as a scrolling display of category data in linkage with the description titles, the category data being displayed in a screen area different from that for the description titles.

According to another embodiment of the present invention, there is provided a user interface controlling method including the steps of: inputting user operation information; and controlling display of data in a switched manner on a display unit based on input information from the inputting step; wherein the display controlling step exercises control, based on the input information coming from the inputting step designating any of upward-, downward-, rightward-, and leftward-pointing buttons, over selection of a data aggregate to be displayed from data aggregates including different categories of data, and over selection of category data for display from the selected data aggregate, before outputting the selected category data to the display unit.

In one preferred variation of the user interface controlling method according to the invention, the data aggregates may be made up of description data formed by combinations of at least one of text data, picture data, and program information data as the different categories of data; and the display controlling step may exercise control, based on the input information coming from the inputting step designating any of the upward-, downward-, rightward-, and leftward-pointing buttons, over selection of particular description data and of any one of the text data, picture data, and program information data constituting the category data for display from the selected description data, before outputting the selected data to the display unit.

In another preferred variation of the interface controlling method according to the invention, the display controlling step may exercise control, based on the input information coming from the inputting step designating any of the upward-, downward-, rightward-, and leftward-pointing buttons, over a scrolling display of description titles as identifiers of the data aggregates and, during the scrolling display, over display of the description titles covering the data belonging to the category designated beforehand for display, in a manner different from the description titles not covering the data.

According to a further preferred variation of the user interface controlling method according to the invention, the display controlling step may give an animated display showing that the description titles not covering the data belonging to the category designated beforehand for display are skipped.

According to an even further preferred variation of the user interface controlling method according to the invention, the display controlling step may perform, based on the input information coming from the inputting step designating any of the upward-, downward-, rightward-, and leftward-pointing buttons, a scrolling display of description titles as identifiers of the data aggregates, as well as a scrolling display of category data in linkage with the description titles, the category data being displayed in a screen area different from that for the description titles.

According to a further embodiment of the present invention, there is provided a computer program for exercising control over a user interface, the computer program including the steps of: inputting user operation information; and controlling display of data in a switched manner on a display unit based on input information from the inputting step; wherein the display controlling step exercises control, based on the input information coming from the inputting step designating any of upward-, downward-, rightward-, and leftward-pointing buttons, over selection of a data aggregate to be displayed from data aggregates including different categories of data, and over selection of category data for display from the selected data aggregate, before outputting the selected category data to the display unit.

The computer program according to the invention, when offered to users, is retained on such recording media as CDs, floppy disks or magneto-optical disks or carried by communication media like networks, in a computer-readable manner for installation into a computer system capable of executing diverse program codes. The computer-readable program when thus installed causes the computer system to implement the processes intended by the program.

As outlined above, the inventive user interface controlling apparatus or method permits a successively switched display of data aggregates such as description data made up of different categories of data including text data, picture data, and program information data. Particular description data is selected on the basis of the input information coming from the user-operated inputting section designating any of the upward-, downward-, rightward-, and leftward-pointing buttons operated. A selection is then made of any one of the text data, picture data, and program information data constituting the category data for display from the selected description data. The selected data is output to the display unit. The inventive apparatus or method thus provides efficient retrieval and display of relevant data.

Preferably, a scrolling display may be given of description titles as identifiers of the data aggregates based on the user-input information derived from any of the upward-, downward-, rightward-, and leftward-pointing buttons operated. During the scrolling display, a display may be given of the description titles covering the data belonging to the category designated beforehand for display, in a manner different from the description titles not covering the data. More specifically, an animated display may be given showing that the description titles not covering the data belonging to the category designated beforehand for display are skipped. Simply viewing the displayed information being scrolled thus allows the user to determine whether each description includes picture data, text data, or other kinds of data.

Other objects, features and advantages of the invention will become more apparent upon a reading of the following description and appended drawings. In this specification, the term "system" refers to a logical configuration of a plurality of component devices. Each of the devices may or may not be housed in a single enclosure.

BRIEF DESCRIPTION OF THE DRAWINGS

FIG. 13 is a block diagram showing a typical hardware structure of the inventive user interface controlling apparatus.

DETAILED DESCRIPTION OF THE PREFERRED EMBODIMENTS

A user interface controlling apparatus, a user interface controlling method, and a computer program according to the invention will now be described in detail with reference to the accompanying drawings.

Figure 1:
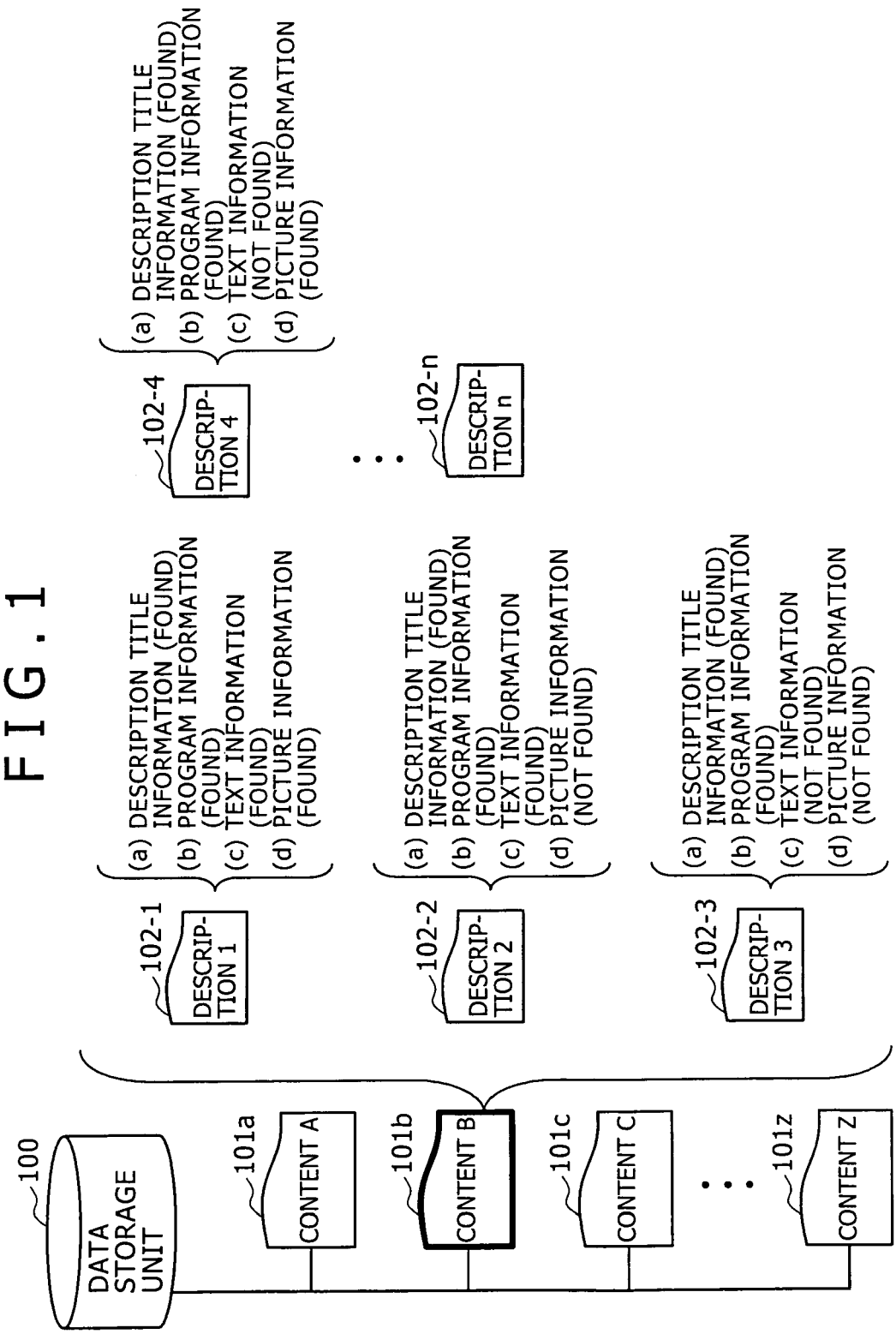
FIG. 1 is an explanatory view showing a typical data structure subject to processing by a user interface controlling apparatus embodying this invention.

Described first with reference to FIG. 1 is a basic structure of data that is output to a display unit by the user interface controlling apparatus embodying the invention. Illustratively, the inventive apparatus presents data retrieved from a data storage unit 100 such as a hard disk drive onto the display unit, and switches the presented data to reflect a user's input. The output data may be admitted over a network or read from storage media such as DVD. It is assumed hereunder that the data is displayed after retrieval from the data storage unit 100.

As shown in FIG. 1, the data storage unit 100 retains diverse contents A 101*a* through Z 101*z*, any of which may be selected by the user for display. The data to be displayed on the display unit is selected under control of the user interface controlling apparatus.

A content B 101*b* accommodates information made up of a plurality of descriptions 102-1 through 102-*n*. The information constituting each description is formed as a data aggregate made up of data elements in the following different categories:

(a) description title information;
(b) program information;
(c) text information; and
(d) picture information.

Not all of the descriptions 102-1 through 102-*n* may include all the elements (a) through (d) of the above categories. In the example of FIG. 1, a description 1 (102-1) includes all data elements (a) through (d); a description 2 (102-2) is formed by the data elements (a) through (c) only; and a description 3 (102-3) is constituted by the data elements (a) and (b) alone. The user interface controlling apparatus of this invention is designed to permit selective display of data composed of these different elements in the different categories (description title information (a), program information (b), text information (c), picture information (d)).

Figure 2:
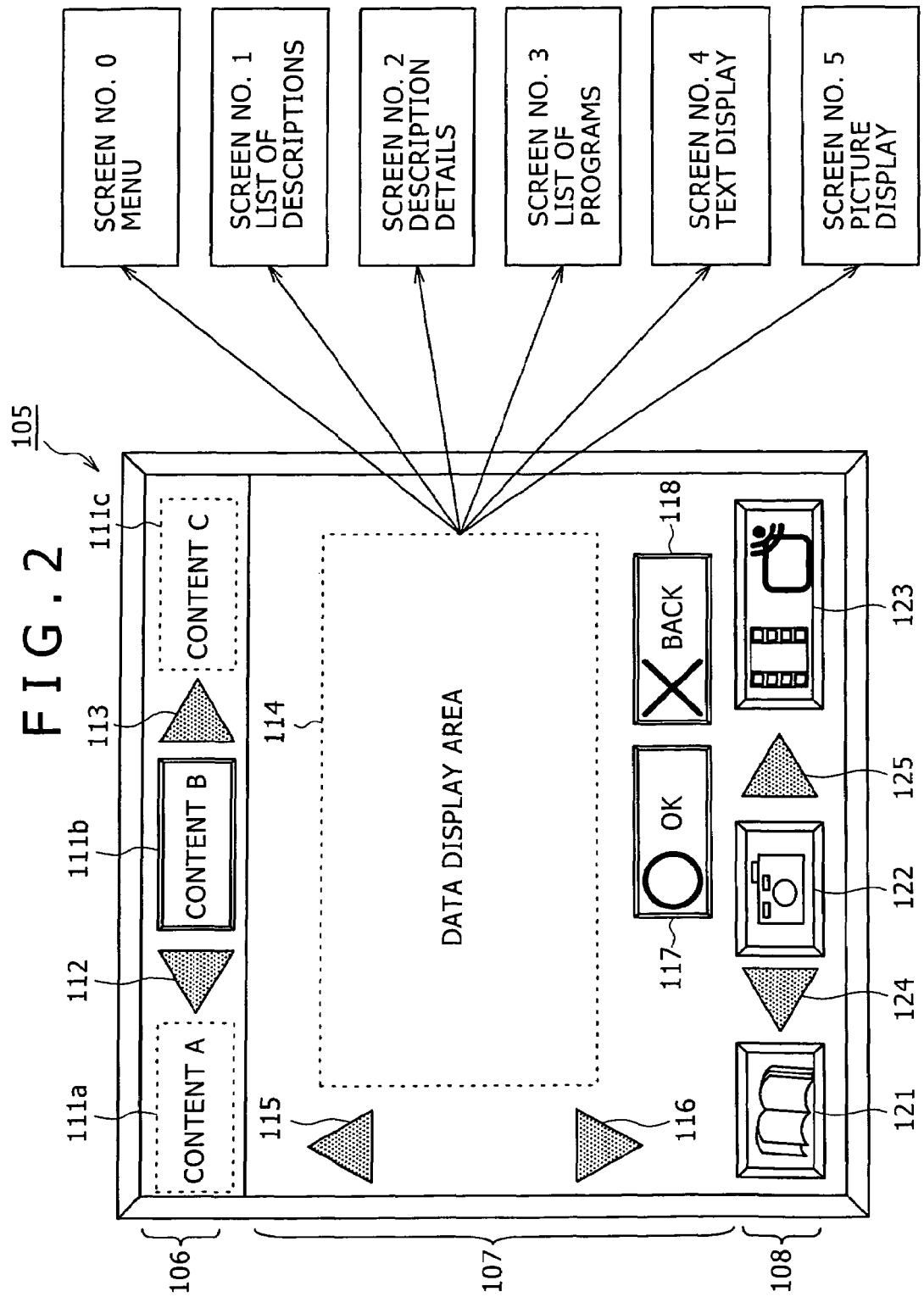
FIG. 2 is a schematic view showing a basic structure of data displayed by the inventive user interface controlling apparatus.

Described below with reference to FIG. 2 is a basic structure of data displayed on a display unit under control of the user interface controlling apparatus according to the invention. As shown in FIG. 2, a display screen 105 has a content selection area 106, a selected content display area 107, and a category selection area 108. The content to be displayed is selected by the user operating a leftward-pointing button 112 and rightward-pointing button 113 in the content selection area 106. A content A 111*a*, a content B 111*b*, a content C 111*c*, etc., represent categorized data in increments of contents, one of which may be selected. The illustration indicates that the content B 111*b* is being selected. The selected content display area 107 displays data in diverse categories included in the selected content B 111*b*.

The content A 111*a*, content B 111*b*, content C 111*c*, etc., in the content selection area 106 correspond to the content A 101*a*, content B 101*b*, content C 101*c*, etc., respectively in FIG. 1.

A desired category of data is selected by operating category selection buttons 121, 122 and 123. Switchover between these buttons is executed by operating a leftward-pointing button 124 and a rightward-pointing button 125. The category selection button 121 is used for selecting text information, the button 122 for selecting picture information, and the button 123 for selecting program information.

The selected content display area 107 in FIG. 2 presents data from within the selected content, i.e., information about the descriptions 102-1 through 102-*n* shown in FIG. 1. The selected content display area 107 includes a data display area 114 for displaying data such as the above-mentioned description title information (a), program information (b), text information (c), and picture information (d); an upward-pointing button 115 and a downward-pointing button 116 for switching data displayed in the data display area 114; an OK button 117 for finalizing what has been selected; and a back button 118. The layout of these buttons and their purposes vary with the category of data being displayed in the data display area 114. Depending on the selection screen on display, the content selection area 106 or the category selection area 108 will not appear. Details of such screen arrangements will be discussed below.

As illustrated, the data display area 114 displays data constituting one of six screens Nos. 0 through 5. The screens are:

a menu screen as the screen No. 0;
a description list screen as the screen No. 1;
a description detail screen as the screen No. 2;
a program list screen as the screen No. 3;
a text display screen as the screen No. 4; and
a picture display screen as the screen No. 5.

The multiple screens above are switched by the user interface controlling apparatus based on input operation information derived from the user-operated buttons on the display screen. An inputting device such as a remote controller for use by the user generally carries controls corresponding to the upward-, downward-, leftward- and rightward-pointing buttons and other operation buttons presented on the display screen. Information reflecting the user's operations on these controls is input to the user interface controlling apparatus.

Figure 3:
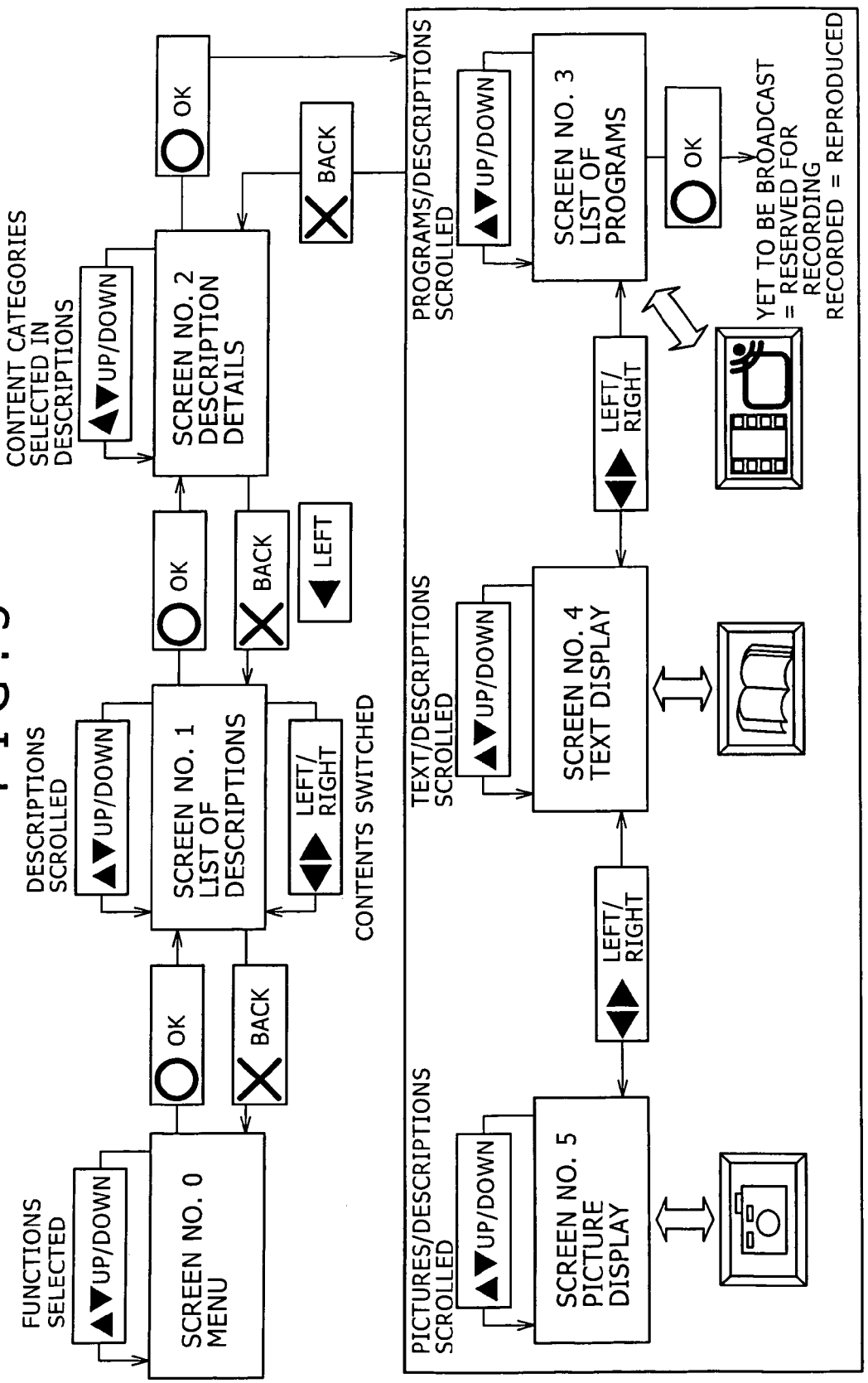
FIG. 3 is an explanatory view showing typical transitions of data displayed by the inventive user interface controlling apparatus.

Described below with reference to FIG. 3 is how the operations on the buttons correspond to the transitions to the screens Nos. 0 through 5. Of the screens Nos. 0 through 5 in FIG. 3, the screen No. 0 is the menu screen that appears upon start-up. The menu screen presents diverse menu data such as recording-related information in addition to the descriptions listed as will be discussed below. On the menu screen as the screen No. 1, a list of descriptions is displayed by operating the upward- and downward-pointing buttons to select a "description listing process" and by operating the OK button to finalize the selection.

Figure 4:
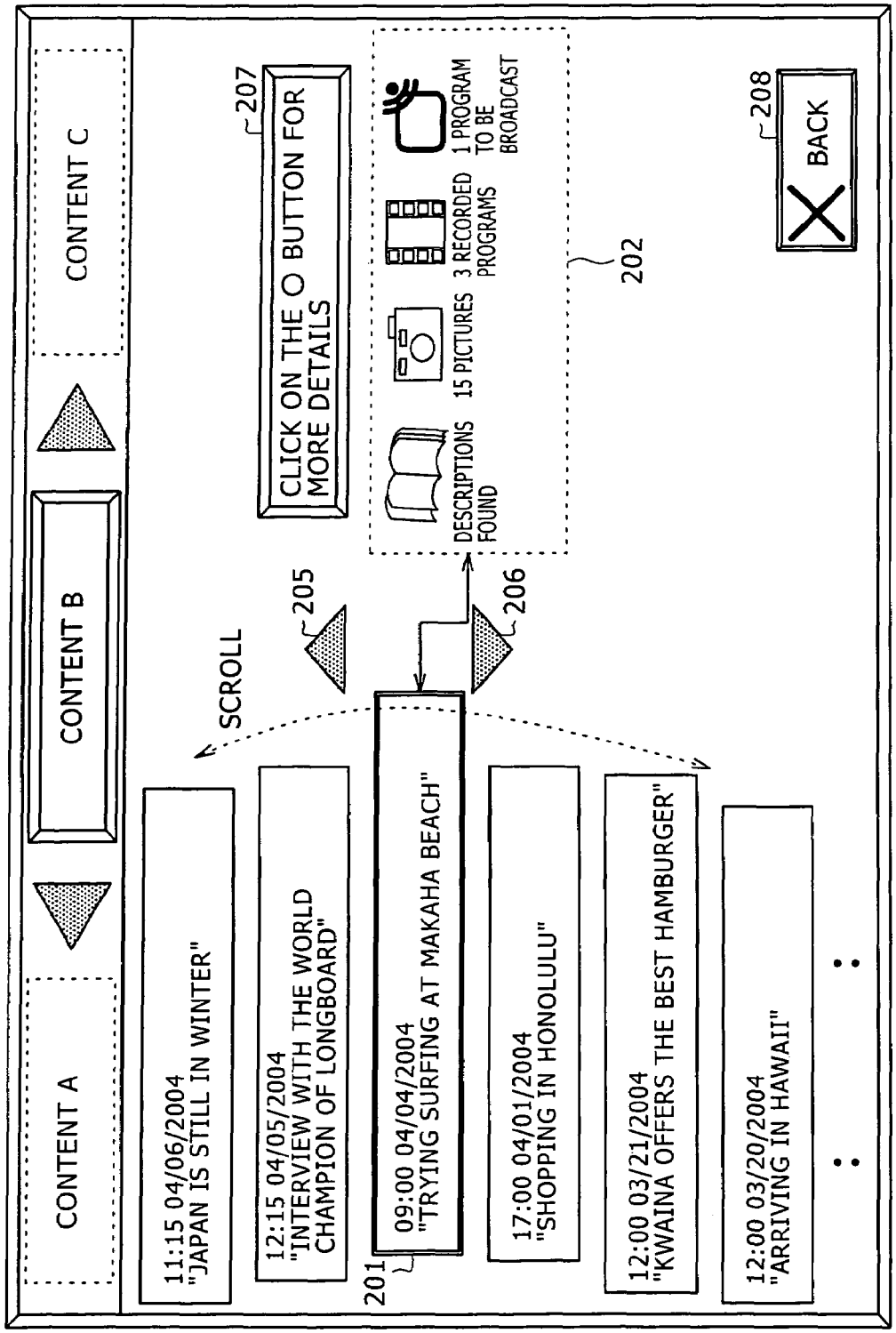
FIG. 4 is a schematic view showing a typical screen displayed under control of the inventive user interface controlling apparatus.

FIG. 4 shows a typical description list screen as the screen No. 1. As illustrated, the description list screen presents a list of description titles and their dates and times of acquisition on the left-hand side of the display area. Operating an upward-pointing button 205 and a downward-pointing button 206 scrolls vertically the titles of the listed descriptions and their dates and times of acquisition. Illustratively, "Japan is still . . . ," "Interview with . . . ," etc., in FIG. 4 are given as description titles together with the corresponding dates and times of acquisition. These description titles in list form correspond to the titles of the descriptions 102-1 through 102-n shown in FIG. 1.

In the example of FIG. 4, a description title 201 "Trying surfing . . . " is being selected. An outline of data related to the description with the title 201 appears in a description outline data display area 202.

On the description list screen of FIG. 4, the OK button corresponds to an operation button 207, i.e., the "Click on the ○ button for more details" button 207. Operating the button 207 effects transition to the description detail screen as the screen No. 2. Operating the back button 208 brings about transition to the menu screen as the screen No. 0. These transitions correspond to the screen transitions shown in FIG. 3.

Figure 5:
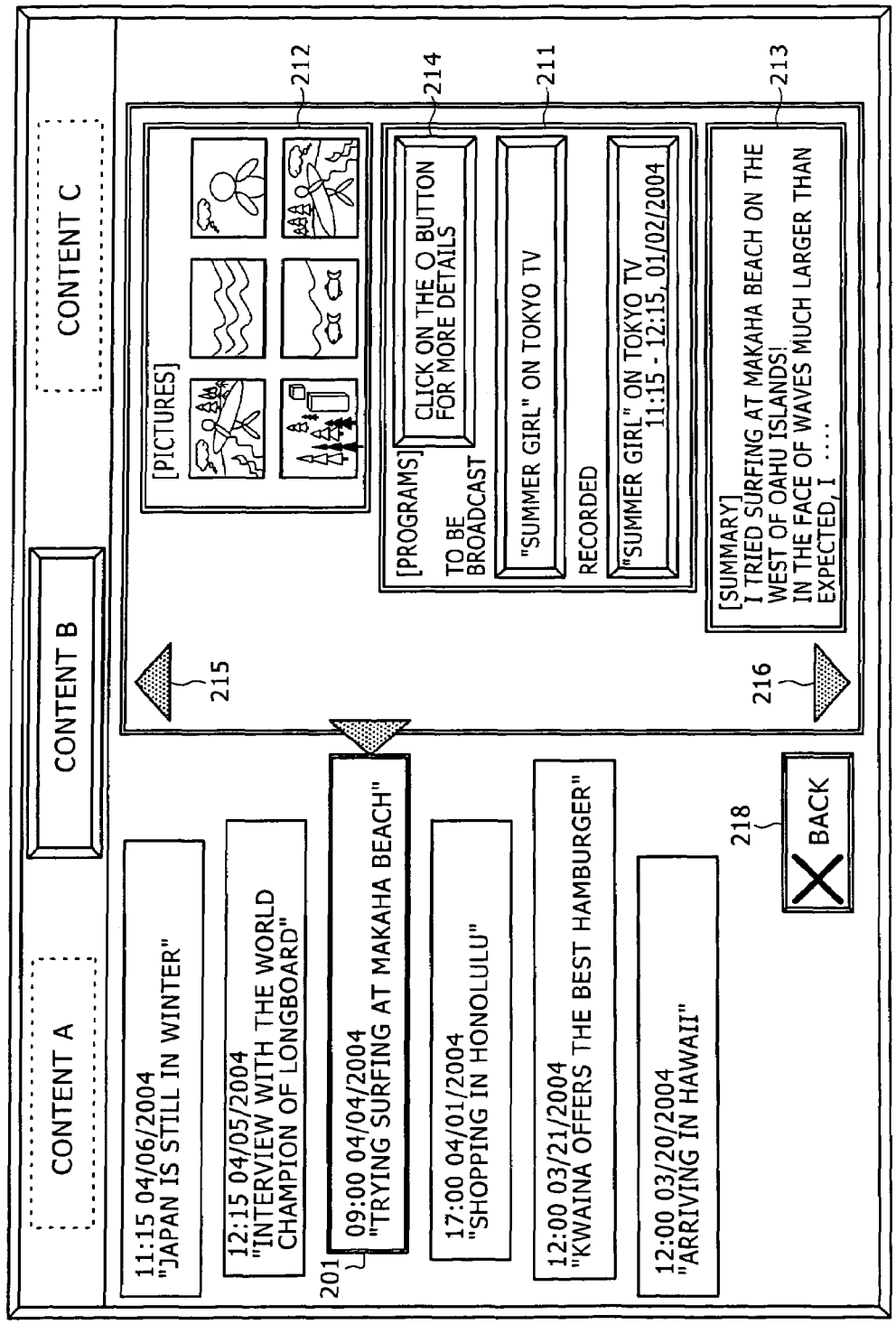
FIG. 5 is a schematic view showing another typical screen displayed under control of the inventive user interface controlling apparatus.

On the description list screen as the screen No. 1 in FIG. 4, operating the "Click on the ○ button for more details" button 207 causes transition to the description detail screen as the screen No. 2. A detailed example of the description detail screen is shown in FIG. 5 as the screen No. 2.

On the description detail screen as the screen No. 2, the left-hand side of the screen presents a list of descriptions together with their dates and times of acquisition. The right-hand side of the screen displays picture information 212, program information 211, and text information 213 in a suitably arranged manner in conjunction with the selected description title. The picture information 212, program information 211, and text information 213 are switched between their positions by operating an upward-pointing button 215 and a downward-pointing button 216.

Figure 6:
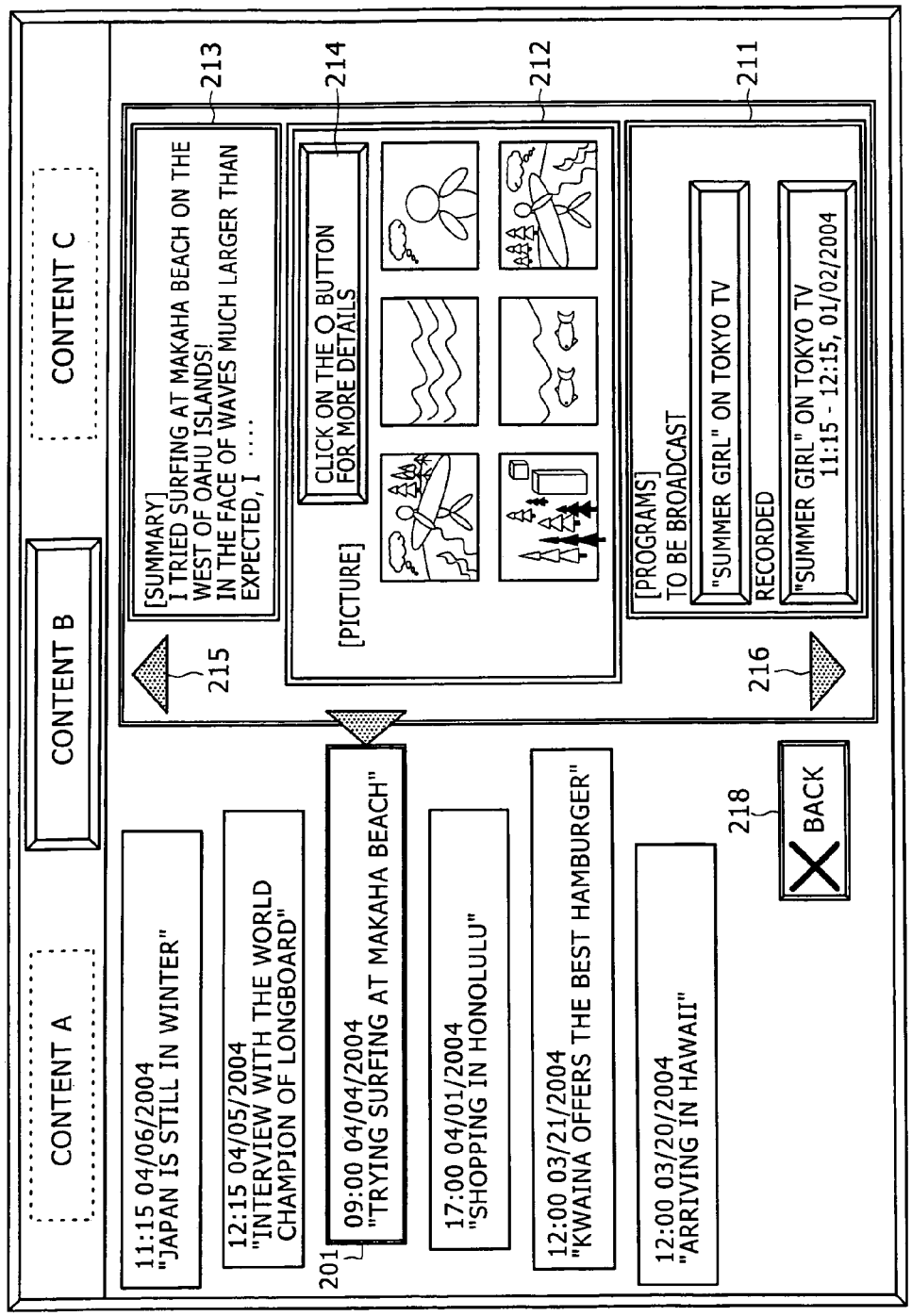
FIG. 6 is a schematic view showing another typical screen displayed under control of the inventive user interface controlling apparatus.

Illustratively, clicking on the upward-pointing button 215 displays the picture information 212 magnified at the center of the right-hand area. FIG. 6 indicates how the picture information 212 is shown magnified at the center. Operating successively the upward-pointing button 215 causes different categories of data from the selected description to appear one another after. In a magnified region at the center appears a "Click on the ○ button for more details" button 214 that is equivalent to the OK button. Operating the button 214 effects transition to one of the screens Nos. 3 through 5.

If the "Click on the ○ button for more details" button 214 is operated in the state of FIG. 6, i.e., where the picture information 212 is shown magnified at the center, then transition is made to the picture display screen as the screen No. 5. If the button 214 is operated in the state of FIG. 5, i.e., where the program information 211 is shown magnified at the center, transition is made to the program list screen as the screen No. 3. Clicking on a back button 218 effects transition to the description list screen as the screen No. 1. These transitions correspond to the screen transitions shown in FIG. 3.

Figure 7:
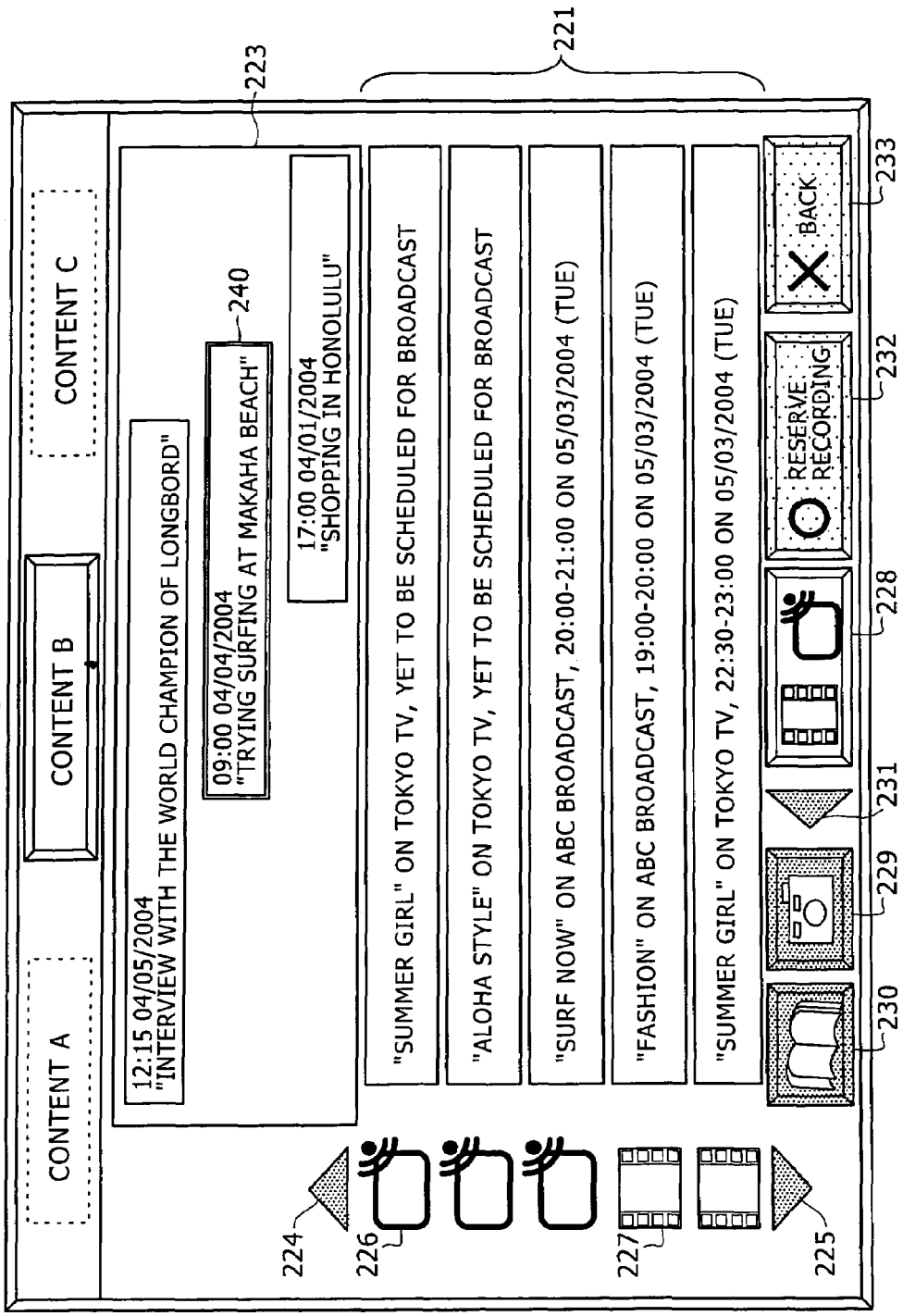
FIG. 7 is a schematic view showing another typical screen displayed under control of the inventive user interface controlling apparatus.

FIG. 7 shows a detailed example of the program list screen as the screen No. 3. This screen is reached when a "Click on the ○ button for more details" button 214 is operated on the description detail screen as the screen No. 2 in FIG. 5.

The program list screen as the screen No. 3 includes a description title information display area 223 and a program information display area 221. The program information whose description title was selected in the description title information display area 223 is displayed in the program information display area 221. In the example of FIG. 7, a title "Trying surfing . . . " 240 is shown selected in the description title information display area 223. The program information corresponding to the title 240 is displayed in the program information display area 221.

A "Scheduled to be broadcast" icon 226 and a "Recorded" icon 227 appear in conjunction with the program information displayed in the program information display area 221 of FIG. 7. These icons indicate whether the program of interest is scheduled to be broadcast or has been recorded. Operating an upward-pointing button 224 and a downward-pointing button 225 permits vertical scrolling of the description title information in the description title information display area 223 in linkage with the program information in the program information display area 221.

Figure 8:
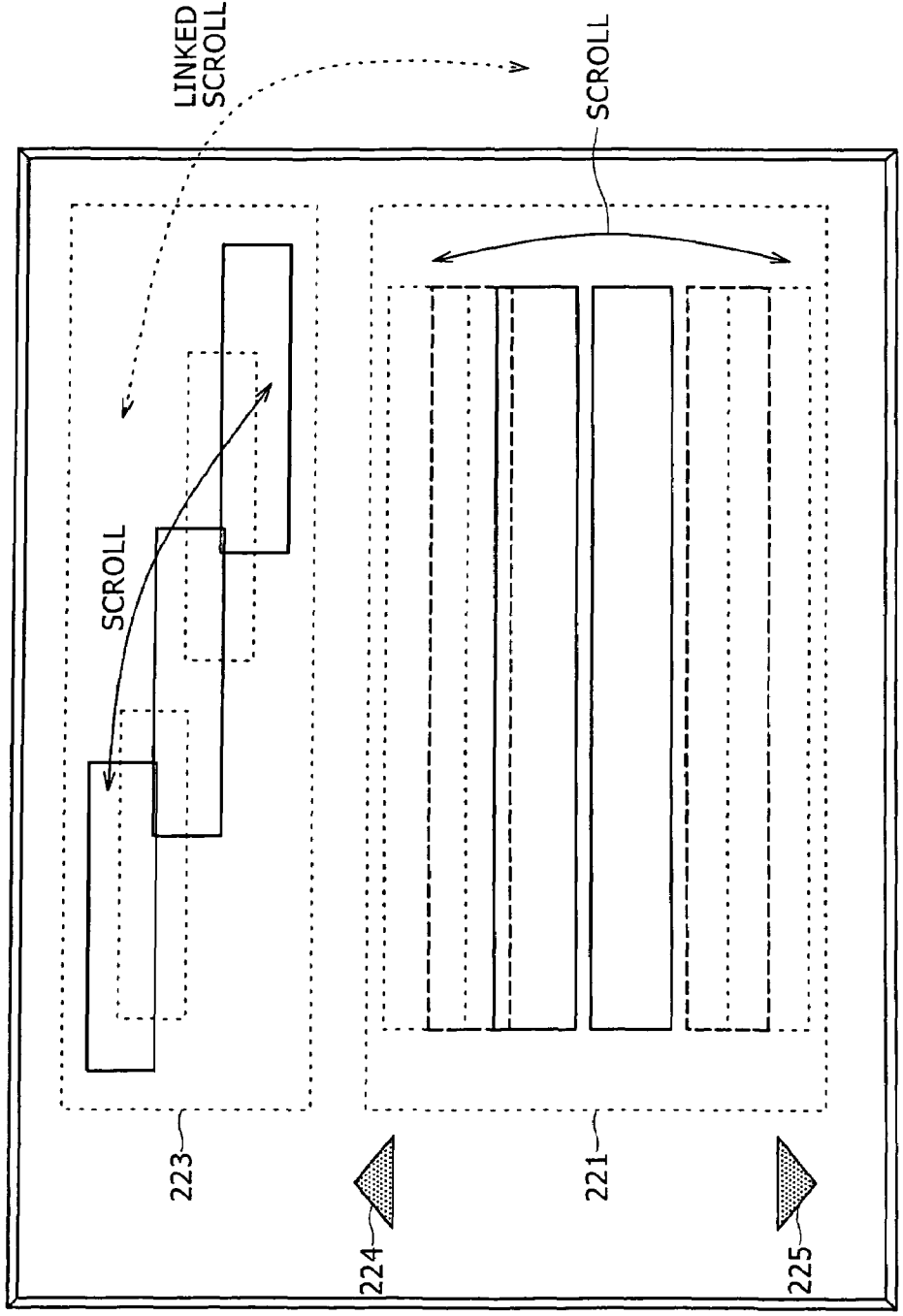
FIG. 8 is an explanatory view showing a scrolling process performed under control of the inventive user interface controlling apparatus.

How the scrolling process takes places is described below with reference to FIG. 8. When the upward-pointing button 224 is operated, the description title information in the description title information display area 223 is scrolled upward in linkage with the program information in the program information display area 221. When the downward-pointing button 225 is operated, the two kinds of information are scrolled downward in linked fashion.

That is, the data on display is switched in such a manner that the program information corresponding to the description title information in the description title information display area 223 is displayed in the program information display area 221.

Returning to FIG. 7, the structure of the program list screen as the screen No. 3 is explained further. On the program list screen, a "Click on the ○ button for more details" button 232 is equivalent to the OK button. Clicking on the button 232 carries out a recording reservation process on the program selected in the program information display area 221. Operating a back button 233 effects transition to the description detail screen as the screen No. 2.

On the screens Nos. 3 through 5 appear category selection buttons 228, 229 and 230. Transitions between these buttons are effected by operating a leftward/rightward-pointing button 231. The category selection button 228 is used for selecting text information, the button 229 for selecting picture information, and the button 230 for selecting program information. In FIG. 7, the category selection button 228 is shown selected, with the program list screen displayed as the screen No. 3.

Figure 9:
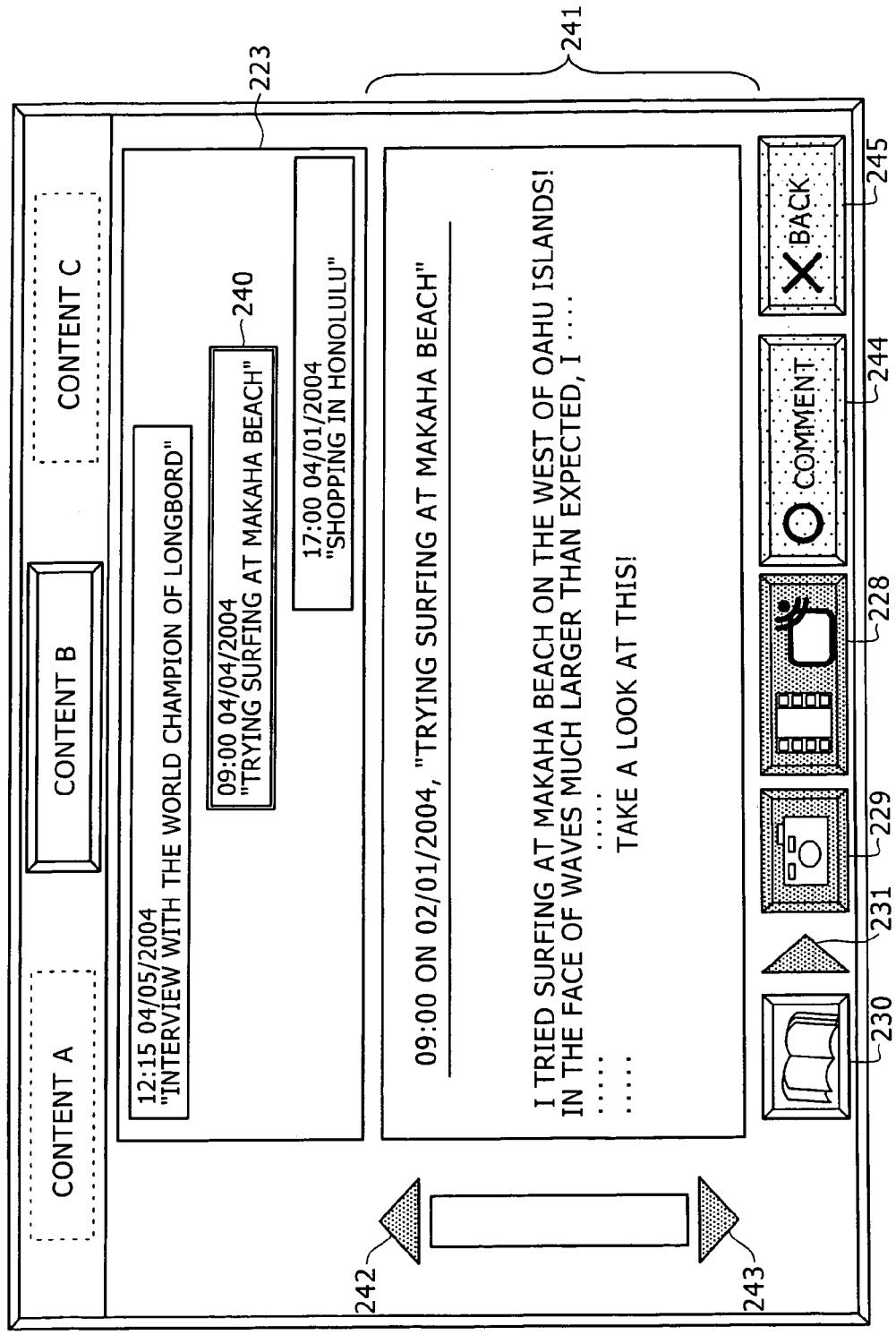
FIG. 9 is a schematic view showing another typical screen displayed under control of the inventive user interface controlling apparatus.

In the state above, clicking on the leftward/rightward-pointing button 231 effects transition either to the text display screen as the screen No. 4 or to the picture display screen as the screen No. 5. FIG. 9 shows a detailed example of the text display screen as the screen No. 4.

The text display screen as the screen No. 4 includes a description title information display area 223 and a text information display area 241. The text information corresponding to the description title selected in the description title information display area 223 is displayed in the text information display area 241.

In the example of FIG. 9, a title "Trying surfing . . . " 240 is shown selected in the description title information display area 223. The text information corresponding to the title 240 is displayed in the text information display area 241.

When an upward-pointing button 242 and a downward-pointing button 243 are operated, the description titles in the description title information display area 223 are scrolled and the selected description is switched successively. In linkage with the scrolling, the text information displayed in the text information display area 241 is being switched. That is, the text information display area 241 displays the text information corresponding to the description title shown selected in the description title information display area 223.

As explained above with reference to FIG. 1, not all descriptions include all of the program information, text information, and picture information. Illustratively, some descriptions have no text information. In such a case, carrying out the scrolling process triggers an animated display showing that the titles of descriptions not including text information are skipped. The display notifies the user that there exist skipped descriptions, i.e., that there are descriptions skipped because they have no text data. The skipping process, as will be discussed later in more detail, is accompanied by the animated display indicating that the titles of the descriptions not including the data belonging to the category for display are skipped.

On the text display screen as the screen No. 4, a "○ Comment" button 244 is equivalent to the OK button. Operating the button 244 effects transition to a screen on which to prepare comments on the description in question. Clicking on the back button 233 makes transition to the description detail screen as the screen No. 2.

On the text display screen as the screen No. 4 also appear the category selection buttons 228, 229 and 230. Transitions between these buttons are effected by operating the leftward/rightward-pointing button 231. In FIG. 9, the category selection button 230 is shown selected, with the text display screen displayed selectively as the screen No. 4.

Figure 10:
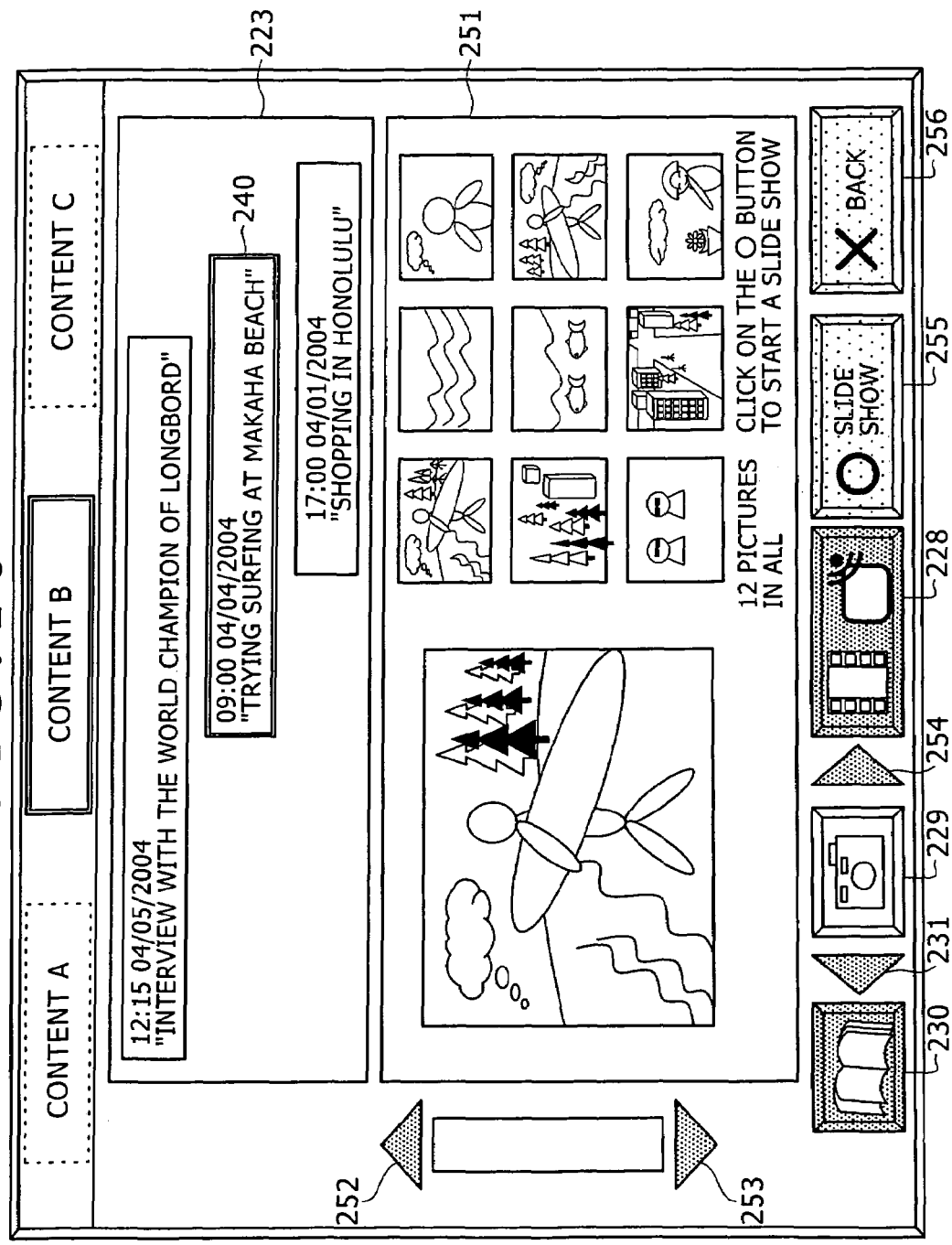
FIG. 10 is a schematic view showing another typical screen displayed under control of the inventive user interface controlling apparatus.

Operating the leftward/rightward-pointing button 231 effects transition either to the program list screen as the screen No. 3 or to the picture display screen as the screen No. 5. FIG. 10 shows a detailed example of the picture display screen as the screen No. 5.

The picture display screen as the screen No. 5 includes a description title information display area 223 and a picture information display area 251. The picture information corresponding to the description title selected in the description title information display area 223 is displayed in the picture information display area 251.

In the example of FIG. 10, the title "Trying surfing at MAHAKA beach" 240 is shown selected in the description title information display area 223. The picture information corresponding to the title 240 is displayed in the picture information display area 251.

When an upward-pointing button 252 and a downward-pointing button 253 are operated, the description titles in the description title information display area 223 are scrolled and the selected description is switched successively. In linkage with the scrolling, the picture information displayed in the picture information display area 251 is being switched. That is, the picture information display area 251 displays the picture information corresponding to the description title shown selected in the description title information display area 223.

As explained above with reference to FIG. 1, not all descriptions include all of the program information, text information, and picture information. Illustratively, some descriptions have no picture information. In that case, carrying out the scrolling process triggers an animated display showing that the titles of descriptions not including picture information are skipped. The display notifies the user that there exist skipped descriptions, i.e., that there are descriptions skipped because they have no picture data. The skipping process, as will be discussed later in more detail, is accompanied by the animated display indicating that the titles of the descriptions not including the data belonging to the category for display are skipped.

On the picture display screen as the screen No. 5, a "○ Slide show" button 255 is equivalent to the OK button. Operating the button 255 starts a slide show in which a plurality of pictures included in the description of interest are displayed in successively switched fashion. Clicking on a back button 256 makes transition to the description detail screen as the screen No. 2.

On the picture display screen as the screen No. 5 also appear the category selection buttons 228, 229 and 230. Transitions between these buttons are effected by operating a leftward-pointing button 231 and a rightward-pointing button 254. In FIG. 10, the category selection button 229 is shown selected, with the picture display screen displayed selectively as the screen No. 5.

The transitions between the screens Nos. 3 through 5 on display and the skipping process involved will now be described with reference to FIG. 11. As mentioned above, the screens are:

the program list screen as the screen No. 3;
the text display screen as the screen No. 4; and
the picture display screen as the screen No. 5.

As discussed above, description information generally includes program information, text information, and picture information. However, as explained above with reference to FIG. 1, not all descriptions include all of the program information, text information, and picture information. Illustratively, some descriptions may include only program information; others may contain only program and text information.

The user interface controlling apparatus according to this invention switches displays of different categories of data corresponding to a plurality of descriptions having diverse data structures in keeping with the user's instructions, i.e., with operation input information derived from the upward-, downward-, leftward- and rightward-pointing buttons operated. In addition, the apparatus performs the process of skipping descriptions that do not include text or picture information.

A typical screen switching process will now be described with reference to FIG. 11. In FIG. 11, descriptions 1 through 6 correspond to the descriptions shown in the description title information display area 223 in the screen examples of FIGS. 7 through 10. In that area 223, the description titles and their dates and times of acquisition are displayed in reverse chronological order from the top down.

Under the description title information display area 223, the information in the currently selected category is displayed, i.e., the program information, text information, or picture information is displayed exclusive of the other categories of information. The display of the information in the selected category is switched by operating a leftward-pointing button 301 and a rightward-pointing button 302 shown in FIG. 11. The descriptions are switched by operating an upward-pointing button 303 and a downward-pointing button 304. These four buttons correspond to the rightward-, leftward-, upward- and downward-pointing buttons shown in the screen examples of FIGS. 7 through 10.

Below is a description of what typically takes place when the category of text information is selected and displayed under the description title information display area 223. This case corresponds to the screen display example of FIG. 9 discussed above.

Figure 11:
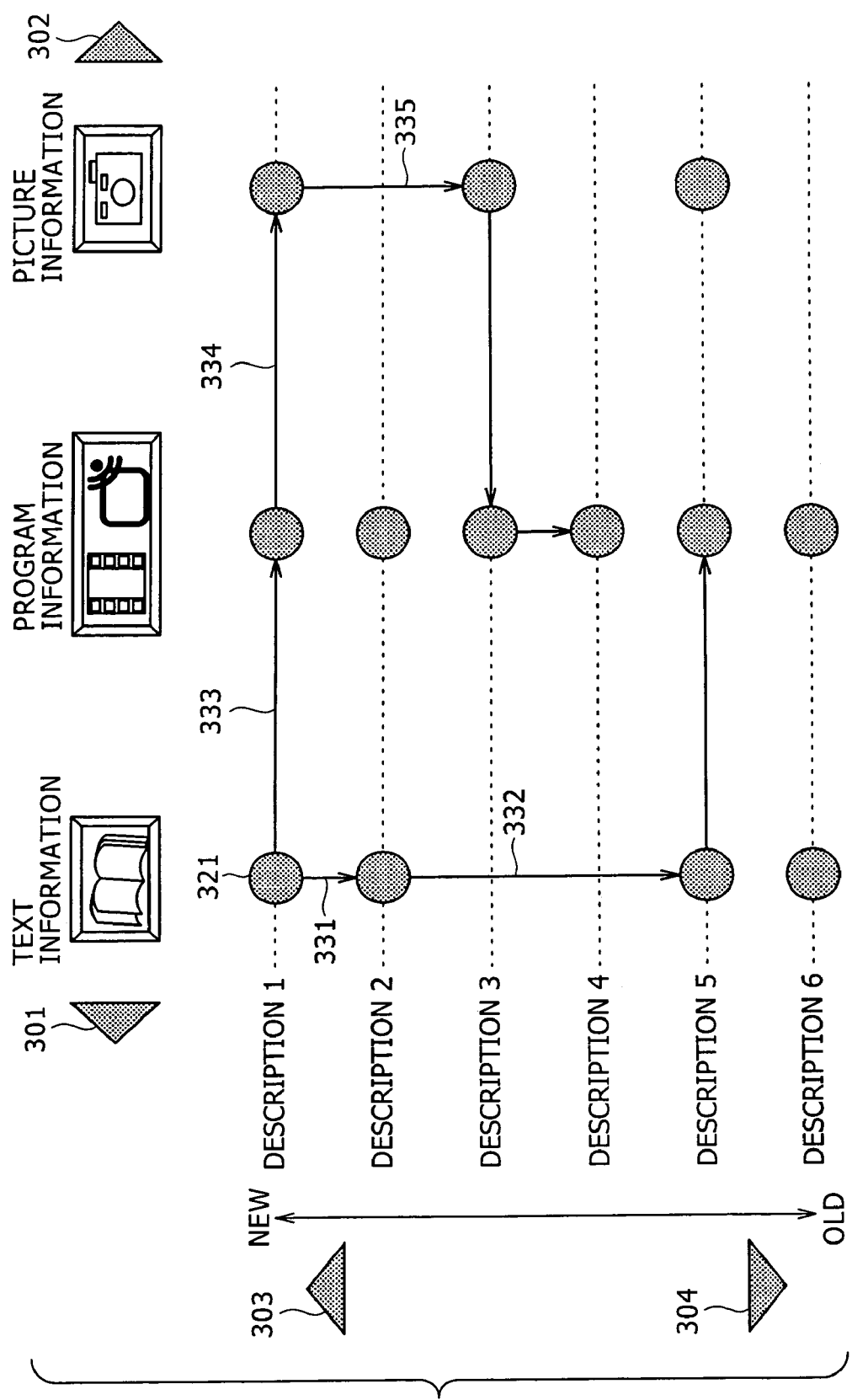
FIG. 11 is an explanatory view showing typical transitions and skipping of data displayed under control of the inventive user interface controlling apparatus.

In FIG. 11, a mark 321 indicates that the text of the description 1 is being displayed. In this state, clicking on the upward-pointing button 303 or downward-pointing button 304 (corresponding to the upward-pointing button 242 and downward-pointing button 243 in FIG. 9) scrolls the description title information in the description title information display area 223 of FIG. 9. That is, the description title information displayed in the description title information display area 223 is scrolled in ascending order of the descriptions (2, 3, 4, etc.) in the direction of arrows 331 and 332 in FIG. 11.

The description 2 includes text information, while the descriptions 3 and 4 have no text information. In this case, the description information display area 223 where description title information is shown scrolled gives each of two kinds of description title display in a different form. That is, the titles of descriptions including text information are displayed in a manner different from the titles of description without text information. More specifically, a process is carried out to provide an animated display notifying the user that the titles of descriptions without text information are skipped. The animated display may appear in diverse forms. Illustratively, the titles of descriptions including text information may be displayed in a color different from the titles of descriptions without text information, or the titles of the two kinds of descriptions may be displayed in different movements.

If the skipped description title information is set to be unselected for display and if text information is selected for display, then an animated display is given indicating that the titles of descriptions without text data are skipped. Only the titles of the description including text information are made selectable. In the example of FIG. 11, the descriptions 3 and 4 have no text information and are thus shown skipped (i.e., unselected for display). Only when the scrolling process reaches the description 5, is the description 5 shown selectable.

If the upward- or downward-pointing button is operated in the state of FIG. 11 where text information is set for display, the transition of display is made first to the text information from the description 1, then to the text information from the description 2, and to the text information from the description 5, with the descriptions 3 and 4 skipped for lack of texts.

It may be desired to switch the current category of display while the text information from the description 1 is being displayed. In such a case, the leftward-pointing button 301 or rightward-pointing button 302 is operated as needed. Clicking on the button 301 or 302 triggers the transition between categories in the direction of an arrow 333 or an arrow 334, whereby the program information from the description 1 (see FIG. 7) or its picture information (see FIG. 10) is displayed.

Where the picture information from the description 1 is being displayed (see FIG. 10), operating the upward-pointing button 303 or downward-pointing button 304 (corresponding to the upward-pointing button 252 and downward-pointing button 253 in FIG. 10) scrolls the description title information in the description title information display area 223 of FIG. 10. That is, the description title information displayed in the description title information display area 223 is scrolled in ascending order of the descriptions (2, 3, 4, etc.) in the direction of an arrow 335 in FIG. 11.

The description 2 does not include picture information. In this case, the description information display area 223 where description title information is shown scrolled gives each of two kinds of description title display in a different form. That is, the titles of descriptions including picture information are displayed in a manner different from the titles of description without picture information. More specifically, a process is carried out to provide an animated display informing the user that the titles of descriptions without picture information are skipped. The animated display may appear in diverse forms. Illustratively, the titles of descriptions including picture information may be displayed in a color different from the titles of descriptions without picture information, or the titles of the two kinds of descriptions may be displayed in different movements.

With the skipped description title information set to be unselected for display, only the titles of the description including picture information are made selectable. In the example of FIG. 11, the description 2 has no picture information and is thus shown skipped (i.e., unselected for display). Only when the scrolling process reaches the description 3, is the description 3 shown selectable.

The inventive user interface controlling apparatus, as described above, deals with a mixture of descriptions (data aggregates) that include all different categories of data and descriptions (data aggregates) that include only part of the different data categories. The apparatus is arranged to select any one of these descriptions and cause a specific category of data to be extracted from the selected description and displayed. With the user-designated particular category of data set for display, the inventive apparatus permits the descriptions to be switched successively while skipping the titles of descriptions not including the data corresponding to the display-destined category. A suitable animated display is provided to let the user know the skipped description titles. These arrangements allow the user to view the descriptions efficiently while confident of the presence of the data therein corresponding to the category for display, without the need to determine whether each of the descriptions indeed includes the relevant data.

In other words, the inventive apparatus may provide a scrolling display of description titles as identifiers of the data aggregates based on the user-input information derived from any of the upward-, downward-, rightward-, and leftward-pointing buttons operated. During the scrolling display, a display may be given of the description titles covering the data belonging to the category designated beforehand for display, in a manner different from the description titles not covering the data. More specifically, an animated display may be given showing that the description titles not covering the data belonging to the category designated beforehand for display are skipped. Simply viewing the displayed information being scrolled thus allows the user to determine whether each description includes picture data, text data, or other kinds of data.

Figure 12:
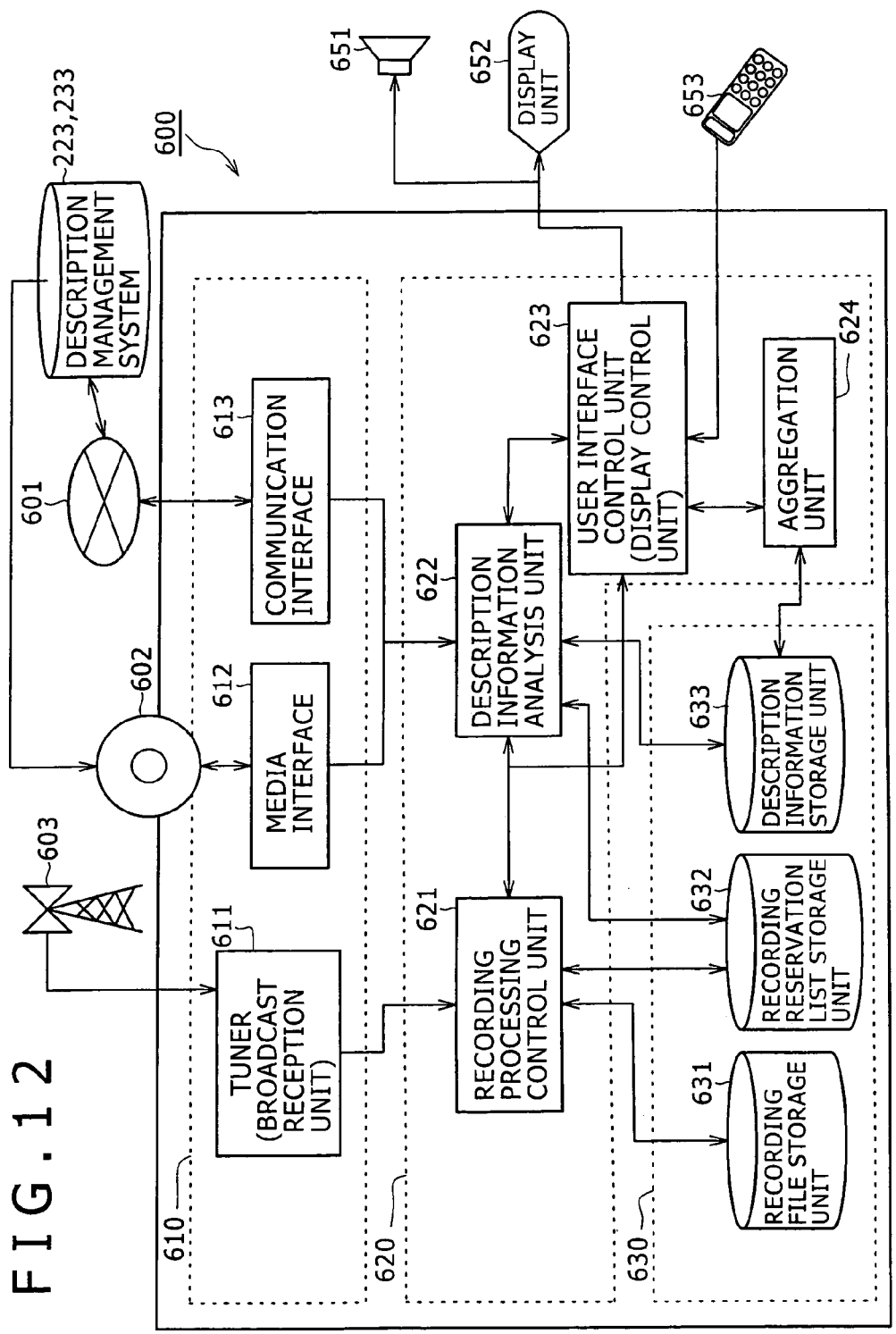
FIG. 12 is a block diagram showing a typical structure of a recording processing device to which the inventive user interface controlling apparatus is applied.

Described below with reference to FIG. 12 is a typical structure of a recording processing device practiced as an information processing apparatus including the user interface controlling apparatus according to the invention.

A recording processing device 600 has a data input unit 610, a data processing unit 620, and a data storage unit 630. The data input unit 610 includes a tuner 611 for receiving broadcasts from broadcast stations 603, a media interface 612 for admitting data from storage media 602 such as DVD, and a communication interface 613 for conducting communications over a network 601 such as the Internet.

The data processing unit 620 has a recording processing control unit 621, a description information analysis unit 622, a user interface control unit (display control unit) 623, and an aggregation unit 624. Specific data processing by the data processing unit 620 is carried out in accordance with appropriate programs under CPU control. The user interface control unit (display control unit) 623 outputs and inputs data to and from speakers 651 serving as a data output unit, a display unit 652 acting as another data output unit, and a remote controller 653 used as a data input unit, whereby the above-mentioned diverse forms of data are created and switched on display.

The data storage unit 630 has a recording file storage unit 631, a recording reservation list storage unit 632, and a description information storage unit 633. The data storage unit 630 made up of these components corresponds illustratively to a hard disk drive.

Description management systems 223 and 233 are illustratively servers that have databases containing descriptions edited by those who are involved in creating broadcast programs such as directors, personalities and staff members. The user's recording processing device 600 can access the servers to acquire the descriptions held therein. As explained above with reference to FIG. 1, the descriptions are composed illustratively of the description title information (a), program information (b), text information (c), and picture information (d). For example, a desired description is acquired through the use of its URL furnished as a description identifier.

The description information analysis unit 622 analyzes such things as data structures. The acquired description information is stored into the description information storage unit 633. The user interface control unit 623 outputs diverse items of video and audio information to the display unit 652 and speakers 651 in keeping with the user's operation information input through the remote controller 653 or the like.

The user interface control unit 623 carries out such processes as switchover control of displayed data during the above-mentioned viewing of descriptions, execution of scroll display, and implementation of the animated display for skipping irrelevant description titles.

The user interface control unit 623 receives operation information from the upward-, downward-, leftward-, and rightward-pointing buttons, OK button, back button, and other buttons operated on the remote controller 653 or like inputting device in order to switch accordingly the display screens shown in FIG. 3. The user interface control unit 623 thus provides switchover control of the screens discussed above with reference to FIGS. 4 through 10. These screens are:

menu screen as the screen No. 0;
description list screen as the screen No. 1;
description detail screen as the screen No. 2;
program list screen as the screen No. 3;
text display screen as the screen No. 4; and
picture display screen as the screen No. 5.

When the user views description information on the display unit 652 and selects the broadcast programs to be recorded unattended, the description information analysis unit 622 creates a recording reservation list containing the corresponding description identifiers, and writes information about the dates and times of the broadcasts involved to the recording reservation list storage unit 632.

Thereafter, the recording processing control unit 621 performs recording processes based on the recording reservation list which is held in the recording reservation list storage unit 632 and which specifies the dates and times of the broadcasts concerned. The recording processing control unit 621 then creates recording files formed by recorded data and writes the created files to the recording file storage unit 631.

FIG. 13 shows a typical hardware structure of the user interface controlling apparatus according to the invention. The inventive user interface controlling apparatus is basically constituted by a an input interface 705, a CPU 701, and a display unit 721. The input interface 705 serves as an input unit for inputting the user's operation information. The CPU 701 acts as a display control unit that switches displayed data based on the input information from the input interface 705. The display unit 721 displays the output data generated under control of the display control unit. The CPU 701 as the display control unit functions in accordance with display control programs placed beforehand in storage such as a HDD 712 and on the basis of the input information derived from the upward-, downward-, rightward-, and leftward-pointing buttons operated on the remote controller 731 or like inputting device. Acting as it does, the CPU 701 selects the description to be displayed from data aggregates making up the stored descriptions including different categories of data such as program information, text information, and picture information. From the selected data aggregate, the CPU 701 selects the data that falls in the category set for display. The selected category data is output to the display 721 for display under CPU control.

The principal components of the user interface controlling apparatus 700 are explained below. In the user interface controlling apparatus 700, the CPU (central processing unit) 701 acting as a main controller provides overall control of the hardware components interconnected via a bus 707.

The CPU 701 performs diverse processes such as the above-described preparation and switching of data for display in keeping with relevant programs held in a ROM (read only memory) 703 or on the HDD 712. A RAM 702 serves as a storage area for use by the CPU 701 in carrying out necessary programs and handling data during the program execution.

The bus 707 is connected with an output interface 704, an input interface 705, and a HDD interface 711. The output interface 704 is connected with the display 721 that outputs the screens discussed above with reference to the accompanying drawings. The input interface 705 admits input information illustratively from the remote controller 731 operated by the user or from a keyboard and a mouse, not shown. The input information includes operation information derived from the above-described upward-, downward-, rightward-, and leftward-pointing buttons and other buttons being operated. In keeping with the display control programs carried out by the CPU 701, processes are performed to switch the menu screen, description list screen, description detail screen, program list screen, text display screen, and picture display screen, along with the scrolling and skipping processes. The skipping process involves, as described above, providing an animated display indicating that the descriptions devoid of data in the category set for display and shown in parallel with the description titles are skipped. The programs used for such displays are stored on the HDD 712 and are retrieved as needed via the HDD interface 711 for execution by the CPU 701.

The series of steps or processes described above may be executed by hardware, by software, or by the combination of both. For the software-based processing to take place, the programs constituting processing sequences may be either loaded from dedicated hardware of a computer into its internal memory for execution, or installed at program execution time from a suitable storage medium into a general-purpose computer or like equipment capable of executing diverse functions based on the installed programs.

For example, the programs may be recorded beforehand on a hard disk or in a ROM (read only memory) used as recording media. Alternatively, the programs may be stored (i.e., recorded) temporarily or permanently on such removable recording media as flexible disks, CD-ROMs (compact disc-read only memories), MO (magneto-optical) disks, DVDs (digital versatile discs), magnetic disks, or semiconductor memories. These removable recording media carrying the programs may be offered to users as so-called package software.

The programs may be brought into the computer not only upon retrieval from the above-mentioned removable recording media but also through download from suitable websites in wireless or wired fashion over a LAN (local area network) or over the Internet. Upon receipt of the programs thus transferred, the computer may install the received programs into its internal storage such as a hard disk drive.

The steps or processes described in this specification may not be carried out solely in the depicted sequence (i.e., on a time series basis); the steps or process may also be executed parallelly or individually as needed or depending on the performance of the apparatus doing the execution. In this specification, the term "system" refers to a logical configuration of a plurality of component devices. Each of the devices may or may not be housed in a single enclosure.

As described above, the user interface controlling apparatus according to the invention permits a successively switched display of data aggregates such as description data made up of different categories of data including text data, picture data, and program information data. Particular description data is selected on the basis of the input information coming from the user-operated inputting device designating any of the upward-, downward-, rightward-, and leftward-pointing buttons operated. A selection is then made of any one of the text data, picture data, and program information data constituting the category data for display from the selected description data. The selected data is output to the display unit. The inventive apparatus thus provides efficient retrieval and display of relevant data.

Preferably, the inventive apparatus may provide a scrolling display of description titles as identifiers of the data aggregates based on the user-input information derived from any of the upward-, downward-, rightward-, and leftward-pointing buttons operated. During the scrolling display, the apparatus may display the description titles covering the data belonging to the category designated beforehand for display, in a manner different from the description titles not covering the data. More specifically, an animated display may be given showing that the description titles not covering the data belonging to the category designated beforehand for display are skipped. Simply viewing the displayed information being scrolled thus allows the user to determine whether each description includes picture data, text data, or other kinds of data.

It is to be understood that while invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A user interface controlling apparatus comprising:
  input means for receiving user operation information; and
  display controlling means for controlling display of data in a switched manner on a display unit based on input information from said input means,
  said display controlling means exercises control, based on said input information of said input means designating any of said upward-, downward-, rightward-, and leftward- directions, of selection of:
  a data aggregate to be displayed from data aggregates including different categories of data, wherein said data aggregates are formed of description data defining varying combinations of at least one of text data, picture data, and program information data as said different categories of data,
  particular description data, and
  any one of the text data, picture data, and program information data constituting said category data for display from the selected description data,
  before outputting the selected category data to said display unit.

2. The user interface controlling apparatus according to claim 1, wherein
  said display controlling means exercises control, based on said input information of said input means designating any of said upward-, downward-, rightward-, and leftward directions, of a scrolling display of description titles as identifiers of said data aggregates and, during said scrolling display, of display of the description titles covering the data belonging to the category designated beforehand for display, in a manner different from the description titles not covering said data.

3. The user interface controlling apparatus according to claim 2, wherein
  said display controlling means provides an animated display showing that the description titles not covering the data belonging to the category designated beforehand for display are skipped.

4. The user interface controlling apparatus according to claim 1, wherein
  said display controlling means performs, based on said input information coming from said inputting means designating any of said upward-, downward-, rightward-, and leftward directions, a scrolling display of description titles as identifiers of said data aggregates, as well as a scrolling display of category data in linkage with said description titles, said category data being displayed in a screen area different from that for said description titles.

5. A user interface controlling method comprising:
  inputting user operation information; and
  controlling display of data in a switched manner on a display unit based on input information from said inputting,
  said display controlling exercises control, based on said input information coming from said inputting designating any of upward-, downward-, rightward-, and leftward-directions, of selection of:
  a data aggregate to be displayed from data aggregates including different categories of data, wherein said data aggregates are formed of description data defining varying combinations of at least one of text data, picture data, and program information data as said different categories of data,
  particular description data, and
  any one of the text data, picture data, and program information data constituting said category data for display from the selected description data,
  before outputting the selected category data to said display unit.

6. The user interface controlling method according to claim 5, wherein
  said display controlling exercises control, based on said input information coming from said inputting designating any of said upward-, downward-, rightward-, and leftward directions, of a scrolling display of description titles as identifiers of said data aggregates and, during said scrolling display, of display of the description titles covering the data belonging to the category designated beforehand for display, in a manner different from the description titles not covering said data.

7. The user interface controlling method according to claim 6, wherein
said display controlling gives an animated display showing that the description titles not covering the data belonging to the category designated beforehand for display are skipped.

8. The user interface controlling method according to claim 5, wherein
said display controlling performs, based on said input information coming from said inputting step designating any of said upward-, downward-, rightward-, and leftward directions, a scrolling display of description titles as identifiers of said data aggregates, as well as a scrolling display of category data in linkage with said description titles, said category data being displayed in a screen area different from that for said description titles.

9. A computer readable storage medium encoded with computer program instructions which when executed by a computer implement a method of exercising control over a user interface, said method comprising:
receiving operation information; and
controlling display of data in a switched manner on a display unit based on input information from said inputting;
said display controlling exercises control, based on said input information coming from said inputting designating any of upward, downward, rightward-, and leftward directions, of selection of:
a data aggregate to be displayed from data aggregates including different categories of data, wherein said data aggregates are formed of description data defining varying combinations of at least one of text data, picture data, and program information data as said different categories of data,
particular description data, and
any one of the text data, picture data, and program information data constituting said category data for display from the selected description data,
before outputting the selected data to said display unit.

10. A user interface controlling apparatus comprising:
an device configured to input user operation information; and
a display controlling device configured to control display of data in a switched manner on a display unit based on input information from said input device,
said display controlling device exercises control, based on said input information coming from said inputting device designating any of upward-, downward-, rightward-, and leftward directions, of selection of:
a data aggregate to be displayed from data aggregates including different categories of data, wherein said data aggregates are made up of description data formed by varying combinations of at least one of text data, picture data, and program information data as said different categories of data,
particular description data, and
any one of the text data, picture data, and program information data constituting said category data for display from the selected description data, before outputting the selected data to said display unit.

* * * * *